Aug. 8, 1939.  J. J. WHELAN  2,168,725
BUILDING CONSTRUCTION
Original Filed Sept. 6, 1932   6 Sheets-Sheet 1

Inventor
John J. Whelan
By Bacon & Thomas
Attorneys

Aug. 8, 1939.   J. J. WHELAN   2,168,725
BUILDING CONSTRUCTION
Original Filed Sept. 6, 1932   6 Sheets-Sheet 2
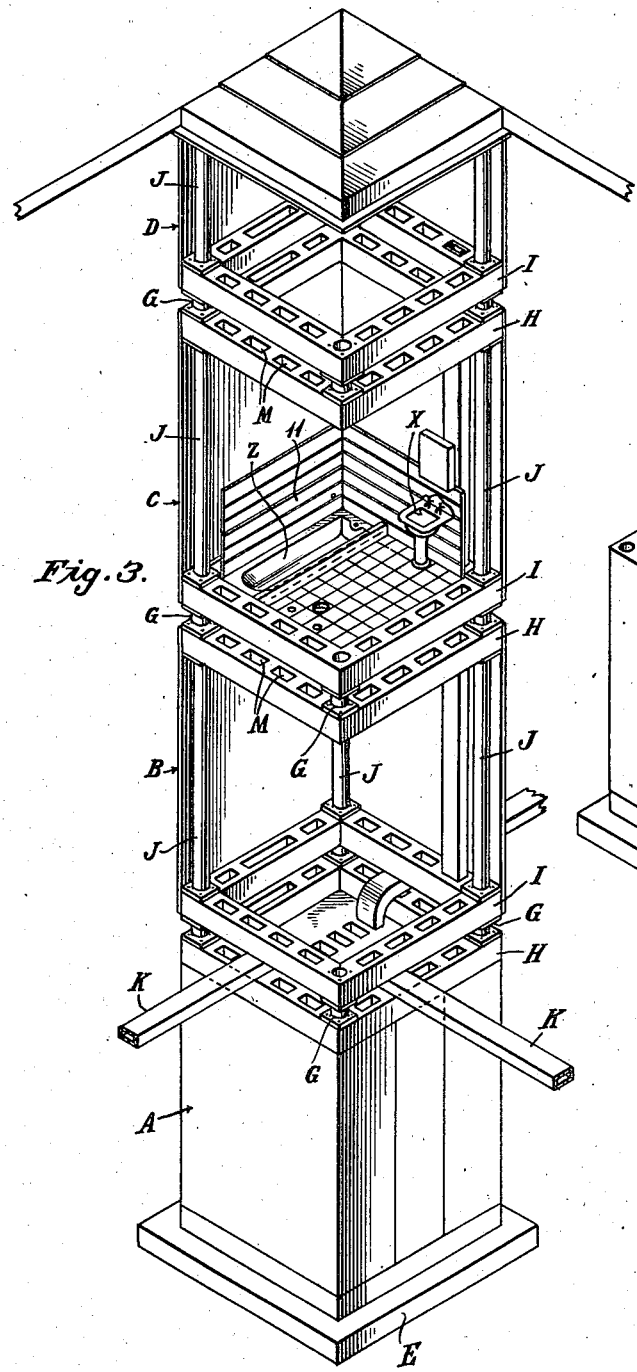
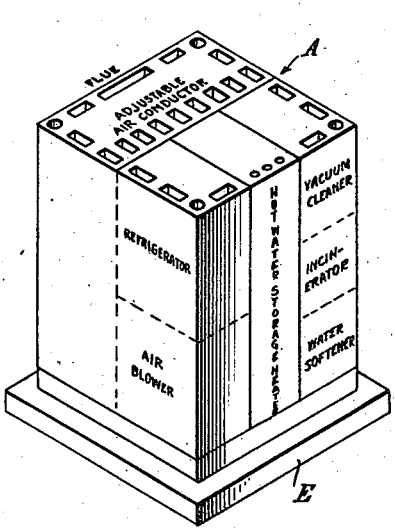
Fig. 4.
Inventor
John J. Whelan
By Bacon & Thomas
Attorneys Aug. 8, 1939.  J. J. WHELAN  2,168,725
BUILDING CONSTRUCTION
Original Filed Sept. 6, 1932   6 Sheets-Sheet 3
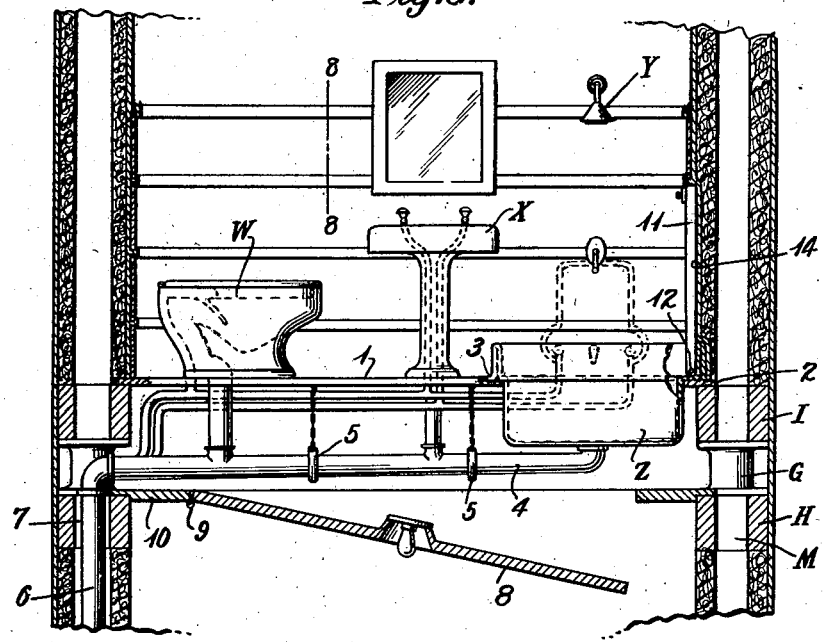
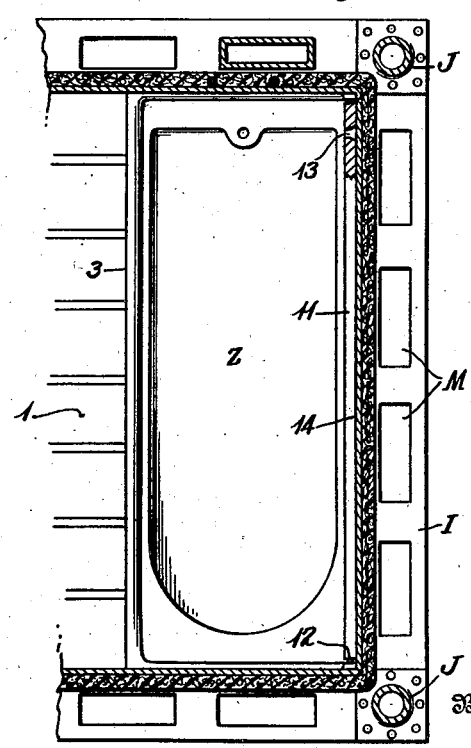
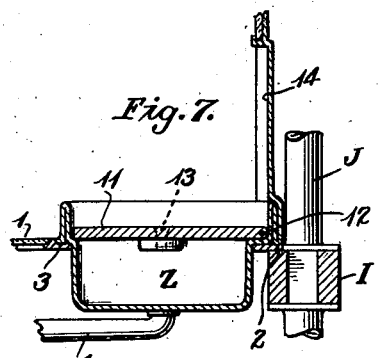
Inventor
John J. Whelan
By Bacon & Thomas
Attorneys

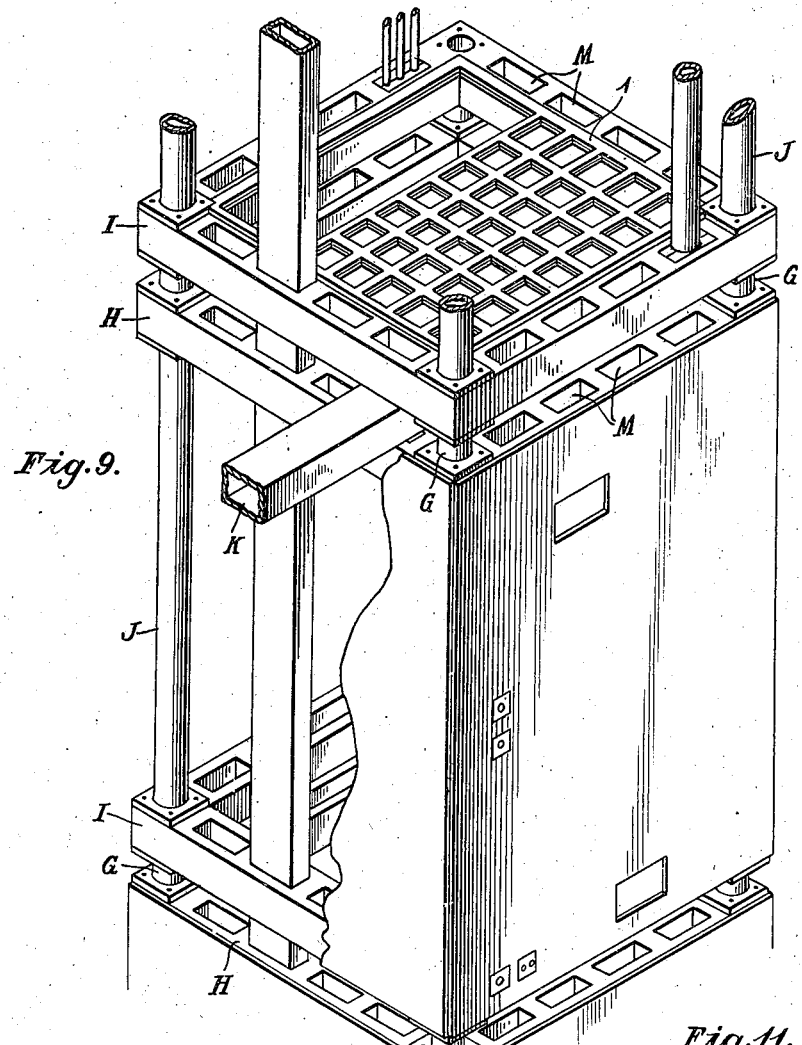
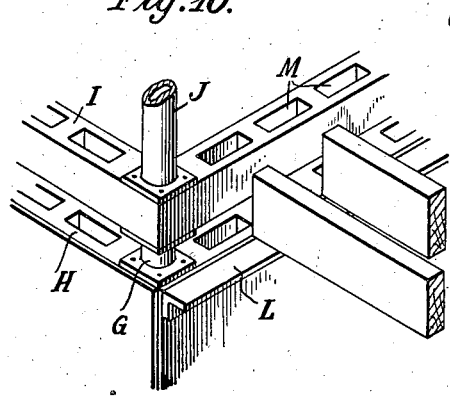
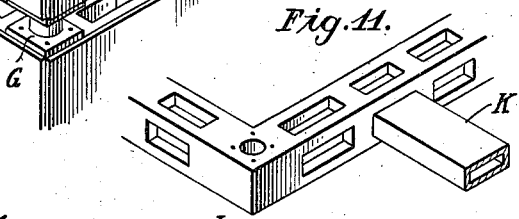
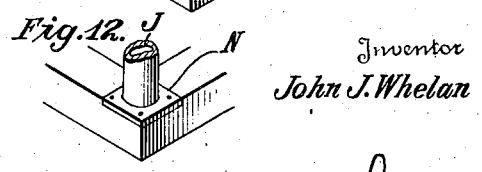

Aug. 8, 1939. J. J. WHELAN 2,168,725
BUILDING CONSTRUCTION
Original Filed Sept. 6, 1932    6 Sheets-Sheet 5
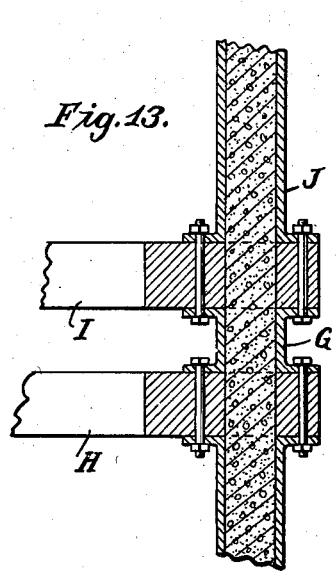
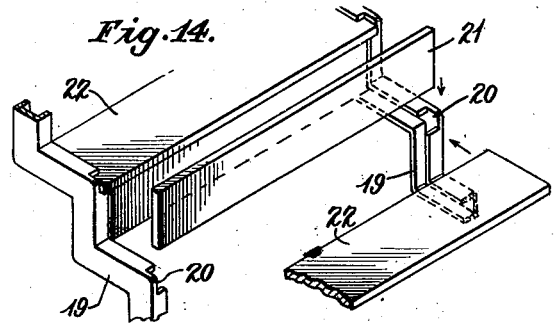
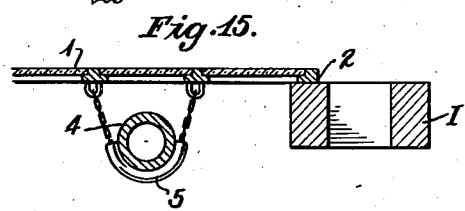
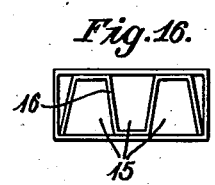
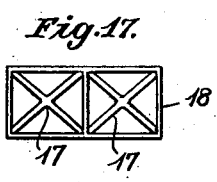
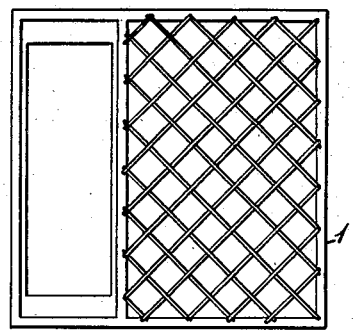
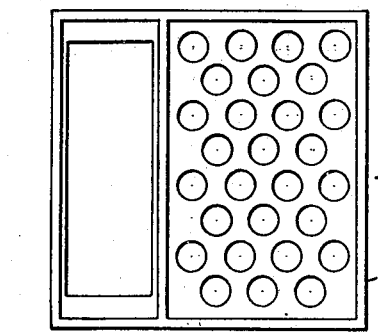
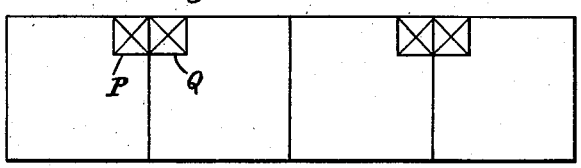
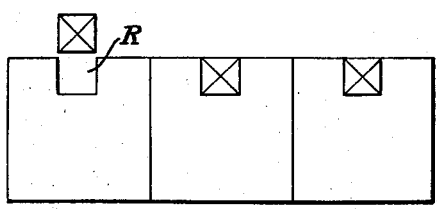
Inventor
John J. Whelan
By Bacon & Thomas
Attorneys Aug. 8, 1939. J. J. WHELAN 2,168,725
BUILDING CONSTRUCTION
Original Filed Sept. 6, 1932   6 Sheets-Sheet 6
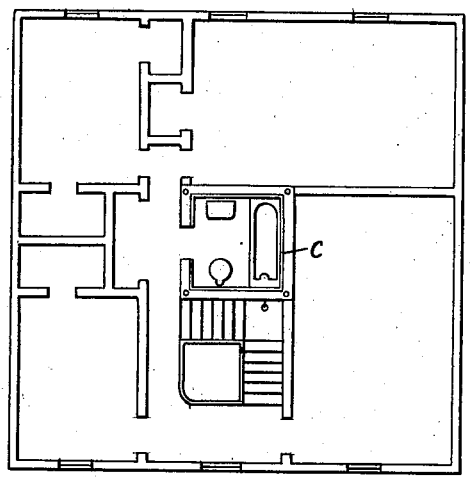
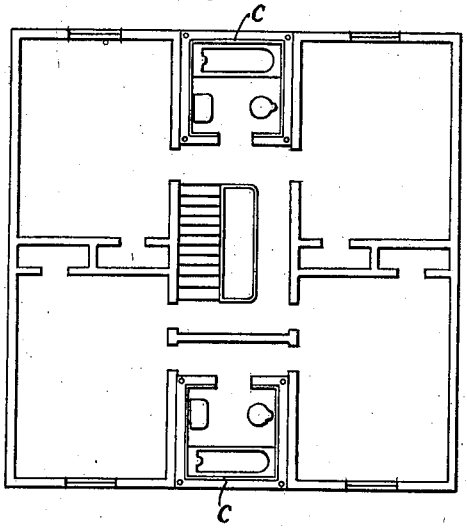
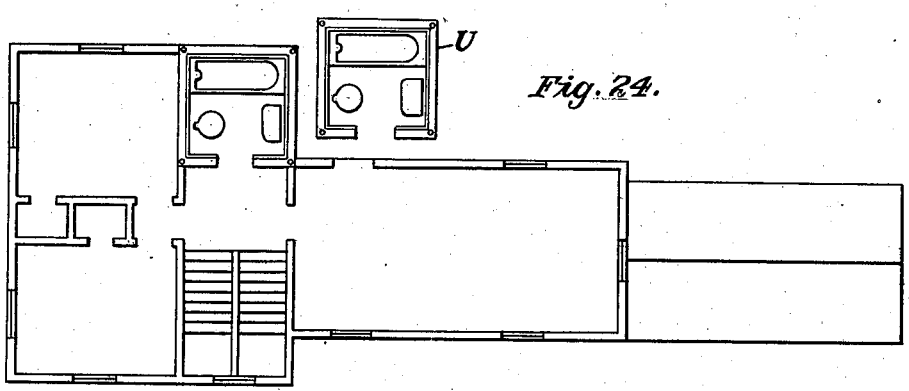
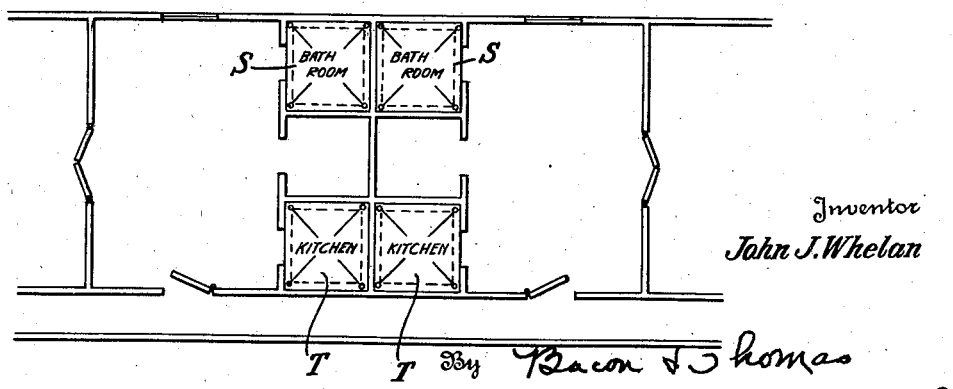
Inventor
John J. Whelan
By Bacon & Thomas
Attorneys Patented Aug. 8, 1939

2,168,725

UNITED STATES PATENT OFFICE 2,168,725

BUILDING CONSTRUCTION

John J. Whelan, Washington, D. C.

Application September 6, 1932, Serial No. 631,927
Renewed October 7, 1938

5 Claims. (Cl. 72—1)

This invention relates to a low cost housing construction.

An object of the invention is to provide a semi-prefabricated house while permitting architectural expression to the option of the home owner.

More particularly, the invention comprehends the employment of a plurality of unitary prefabricated assemblages adapted to be superimposed upon each other and secured together, thereby to form a shaft containing essentially all of the mechanical elements in a centralized manner and having the capability of forming the dual office of a load-supporting member, carrying the adjacent floor loads and roof loads according to the desire of the owner.

Another object of the invention, which may be practiced as a variation of that suggested in the preceding paragraph, is to provide for mass production of the prefabricated units, carrying the mechanical equipment necessary for a house, which may be lowered into a hollow shaft provided in a house after the erection thereof as distinguished from first erecting the shaft, as aforesaid, and thereafter building the floors and roof, etc., therearound.

Still another object, as a further use of the prefabricated units, as described, is to provide means whereby old houses may be rehabilitated at a minimum of expense and time by running the units along the side of such houses or in recesses cut therein for the reception of the load-bearing shaft.

There are a multiplicity of other units and objects of this invention which will be apparent to those skilled in the art from a reading of the following specification in conjunction with the drawings attached hereto and forming a part hereof in which Figure 1 is a diagrammatic view showing a series of prefabricated units arranged in superposed relation to form a load supporting column with the lowermost unit in a cellar and tarpaulins arranged so as to afford protection to workers assembling the remainder of the building about said column;

Figure 3 is an enlarged perspective view of the load supporting column with portions removed to show details of the interior construction;

Figure 4 is a perspective view of the basement unit with the various components thereof identified by suitable legends;

Figure 5 is a fragmentary sectional view of the load supporting column showing certain details of the unit containing the bathroom fixtures;

Figures 6 and 7 are fragmentary sectional views showing details of the sunken bathtub and trap door which may be utilized for converting said bathtub into a suitable shower floor;

Figure 8 is a sectional view taken on the line 8—8 of Figure 5 showing details of the bathroom wall construction;

Figure 9 is a detailed perspective view of a plurality of units constituting the load supporting column and particularly illustrating the openings formed in said units adapted to receive vertical ducts and piping as well as horizontal ducts, etc.;

Figure 10 is a fragmentary perspective view illustrating means for supporting floor joists from one of the column units;

Figure 11 is a detailed perspective view showing a collar of one of the units provided with openings adapted to receive either horizontal or vertical ducts;

Figure 12 is a further detailed perspective view showing a unit collar recessed to receive a flange formed on one end of a hollow tube;

Figure 13 is an enlarged sectional view disclosing the manner in which a plurality of sections are secured in spaced relation, and with concrete filling the hollow portion of the members connecting the sections together;

Figure 14 is a perspective view showing details of a stairway construction;

Figure 15 is a detailed view showing a means for suspending one of the pipes shown in Figure 5;

Figure 1:
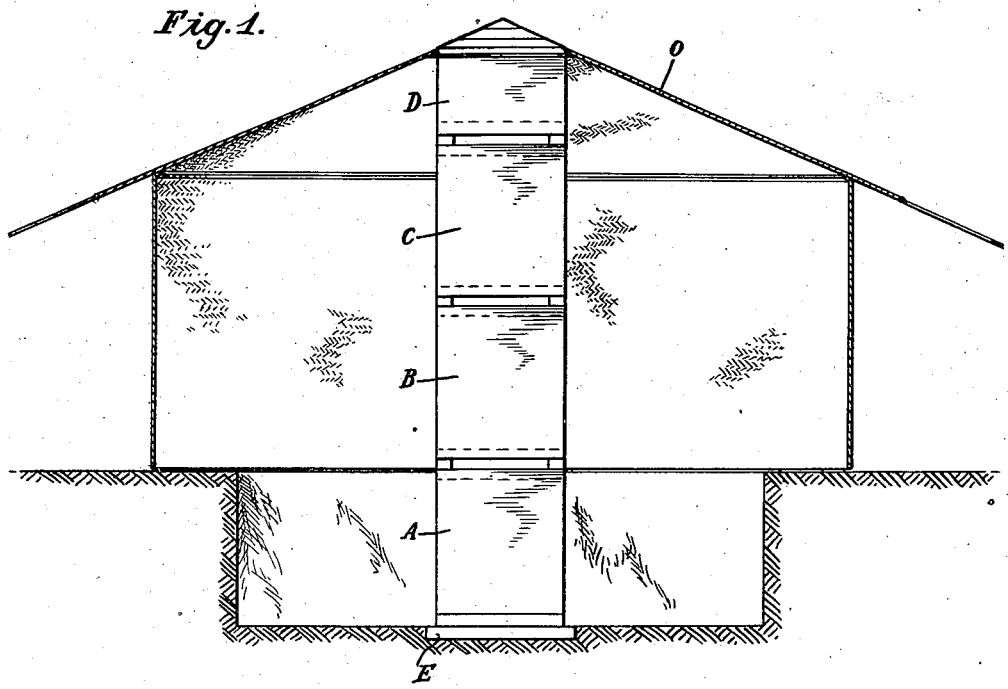

Figures 16 and 17, respectively, illustrate forms of ducts which may be used to advantage with the load supporting column disclosed in Figure 1;

Figure 18 and 19, respectively, illustrate configurations which may be used in the floors of the prefabricated units;

Figures 20 and 21 diagrammatically illustrate the application of prefabricated building units to the remodeling or rehabilitation of old residences;

Figure 22 diagrammatically illustrates a building which has been formed with a central hollow portion into which the units constituting the present invention may be lowered;

Figure 23 shows the application of the invention to a building which has been provided with recesses at opposite sides thereof to receive prefabricated bath units;

Figure 24 illustrates a manner in which a residence may be remodeled by adding prefabricated units thereto which are adapted to engage the exterior walls of said house; and Figure 25 is a diagrammatic view illustrating a manner in which an apartment dwelling may be remodeled by providing recesses therein to receive bath and kitchen units.

Figure 2:
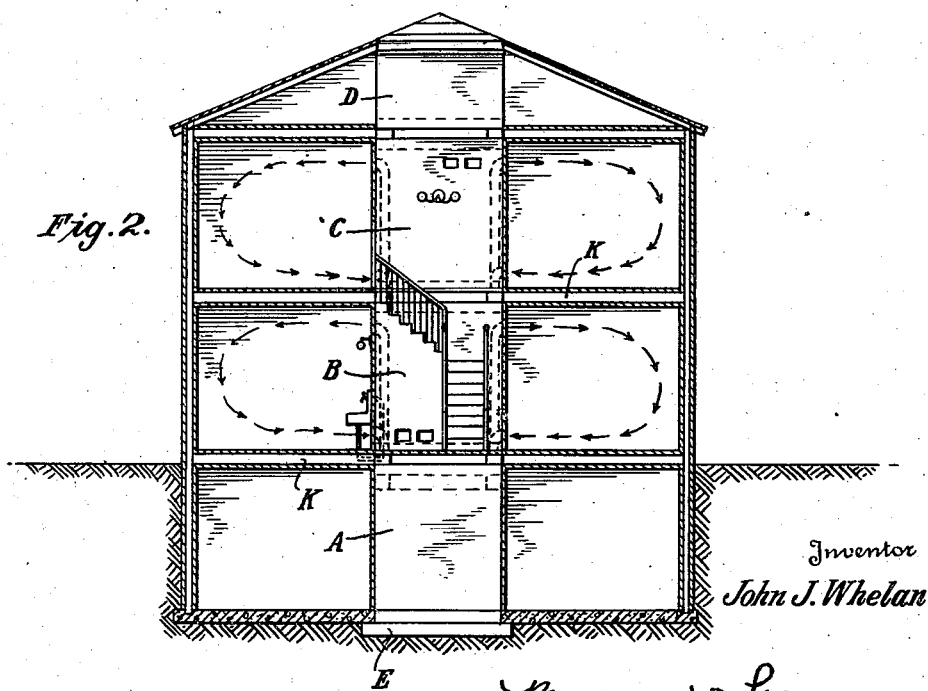
Figure 2 is a diagrammatic view showing a building assembled about the load supporting column shown in Figure 1.

Referring now to the drawings wherein like reference characters indicate corresponding parts, I shall first describe the prefabricated units as they are constructed, in mass production, at the factory. These units are indicated generally by reference characters A, B, C and D. Of course, as many units or types of units may be employed as desired. According to the usual practice, a cellar is first formed in the usual manner and into the same I place unit A, as shown in Fig. 2. This unit A (see Fig. 4) is provided with a base E of any suitable construction and is constructed to house the weighty mechanical parts of a house ordinarily maintained in the cellar including, for instance:

1. An air-conditioned heating system.
2. A hot water heating system and storage tank.
3. A cooling system and refrigerator plant.
4. Water softener.
5. An incinerator.
6. A vacuum cleaning system.
7. Service connections for sewer, gas, water, electric and telephone.

The next unit B may contain:
1. Kitchen sink and drain board.
2. Prefabricated kitchen dressers.
3. Electric refrigerator, while the third unit C may contain:
1. A tub and shower combinaiton.
2. A toilet.
3. A lavatory.
4. Medicine cabinet.
5. Non-slip abrasive metal floor tiling.
6. All electric fixtures and bathroom accessories.

The upper unit D may contain any desirable fixtures for the attic.

These superimposed units are joined together by placing four hollow spools G at the four corners of each unit between the floor collars H and the ceiling collars I. Each unit is provided with hollow tubes J running down the four corners of its walls and the spools G connect the tubes of one unit to the tubes of another, as shown particularly in detail Fig. 13. When the units of the shaft are all in place, concrete is poured into the tubes of the top unit filling all of the tubes below and the spools between thus creating four enclosed concrete load-bearing columns the length of the shaft. The height of the individual units may be varied as desired by changing the height of the spools. Placed, as they are, between the ceiling collar of one unit and the floor collar of another unit, they provide an opening area in which all connections of ducts, pipes, conduits and wires are made. At these open areas the pipes, conduits, wires and ducts may run horizontally from the shaft through the duct joists to other rooms of the building not directly abutting the shaft. This permits all repairs to be made at these junctions and all additional wires, pipes and conduits to be connected without defacing the walls after the house has been completed. In the even of the shaft's removal from the building, all disconnections may be made easily at this same open area. When the shaft is erected and exposed to the weather, the open area is protected by a metal shield. When the units are juxtaposed, they are connected horizontally at the ceiling and floor collars. As shown, the space between the collars permits a means for receiving the ducts K which ducts may constitute also beams for the floors or ceilings. As a variation of this idea, the collars themselves may be provided with apertures, as shown in the modification illustrated in Fig. 11 for receiving these ducts K, or further, as shown in Fig. 10, a flange L may be provided by the units for the purpose of supporting rafters in abutting relationship with respect to the collars. The various apertures provided by these collars as at M may be conveniently utilized for the reception of any building instrumentalities which may be desired to be inserted through the units. Fig. 12 is a slight variation wherein the flange N of the pipe J may be countersunk within a recess provided therefor in the collars.

The shaft as it has thus been erected, to its predetermined height, may be employed, as will be apparent, as a load bearing member and carry the adjacent floor loads and the roof load. As work is begun around the shaft tarpaulins O may be swung from the top of the shaft to provide protection from the elements to the workmen, thus eliminating delays due to bad weather. In severe climates, either hot or cold, tarpaulins may be arranged to completely enclose the structure. Moreover, the air conditioning system, which now is operative within the shaft, may be utilized for the temporary provision of ideal weather for the workmen, thereby increasing their efficiency as well as comfort.

According to this invention, a building may first be constructed with a hollow opening therein, and thereafter, following, for instance, the negotiation of the sale, the mechanical units may be hoisted in any suitable manner and lowered down through the hollow shaft in the house. This method provides for an obvious saving in the financing of a house because the payment for the mechanical assemblages does not start until after the house has been constructed.

The invention also has particular utility in the rehabilitation of old residences in the manner shown in Figs. 20 and 21. In this case, the units are slipped in laterally in recesses provided thereby. In Fig. 20, the shafts formed by the units are arranged in abutting relationship as this has considerable supporting value. This is clearly indicated by reference characters P and Q in Fig. 20, and in the case of Fig. 21 by the reference character R.

The invention also aims to have utility in the rehabilitation of apartment houses which is shown in Fig. 25. In this case a series of units each consisting of bathrooms is placed in superimposed relationship, in the manner above described in connection with the preferred form. This arrangement is indicated by reference character S. On the other side of the building, each of the units consists of the kitchen and these units are placed in superimposed relationship, as aforesaid, and indicated by reference character T. Further, in connection with an addition constructed to a house, as shown in Fig. 24, the units U may be applied by erecting them against any exterior wall, thereby to add the desired bathrooms, pantries or kitchens at a much lower cost and more conveniently than could otherwise be accomplished by present day methods of remodeling. The self-supporting, fire-froof and weather-proof characteristics of any combination of units allow this exterior application for rehabilitation.

As shown in Fig. 2, the construction of the units and collars affords a ready means for causing a circulation to all floors of the construction. The shaft A may also be used for temporary shelter. In the construction of a summer home where no basement or heating system is required, unit B will rest on a foundation at ground level and carry unit C above. As the mechanical equipment for the summer residence would now be complete, the shaft could be enclosed by a canvas house erected tent-like with the shaft as the support. This can be both economically and quickly accomplished. At the end of the summer, the shaft may be left in place for the next season or be enclosed by permanent walls for continued use, or be dismantled and removed to another site. Mining towns, for instance, could be rapidly created in this manner, allowing permanent walls to be built after the mushroom growth of the town had ceased. The use of any combination of units is not confined to perpendicular arrangement but may be juxtaposed horizontally for use, for instance, in one story dwellings.

It will be apparent from the description thus far that the units may be and preferably are of knock-down character. That is to say, the casings of the units may be suitably hinged or otherwise detachably connected so that they may be knocked down for shipping while the various mechanical elements may be separately shipped and assembled within the confines of the casings of the units at their destination or at a local assembling branch of the organization engaged in the enterprise.

There are many detailed structural characteristics of the invention which have special utility in connection with the general idea thus far described. For instance, the upper unit C, containing the bathroom, is of metal construction and is preferably provided with grooves for removably receiving tiles V, as shown in Fig. 8. This unit may comprise a lavatory W, washstand X, shower Y and a sunken tub Z. This tub is preferably of metal and can be satisfactorily supported by the metal floor 1 as at 2 and 3. The drain 4 for the bathtub is conveniently supported by hangers 5 secured to the bottom of the metal floor, and the soil pipe 6 runs down through the aperture 7 provided by the collars. A drop ceiling 8 is preferably hinged as at 9 by a bracket 10 resting on the collar in any desired manner. The entire equipment for the bathroom is thus compactly situated and associated with the unitary assemblages, and inspection and repair are readily accomplished. The sunken bathtub, above described, is preferably provided with what I term a trap door 11 as more clearly shown in Fig. 7, which is hinged as at 12 thereby to permit it to constitute a supporting medium in the event that the shower Y is desired to be utilized. The trap door, of course, has suitable drainage means 13 associated therewith. It is desired that this trap door be lowered normally in view of the sunken construction of the bathtub. A recess 14 is provided in the side wall of the unit for receiving this trap door when in its raised position, as shown in Fig. 5. The floor may be of different desirable configurations, as shown in Figs. 18 and 19. Further, the ducts may take divers cross sectional forms, as shown in Figs. 16 and 17. As shown in Fig. 16, a multiplicity of compartments 15 are defined by corrugating a sheet of metal 16, as shown. In Fig. 17, a plurality of elements 17 are preferably provided which, in conjunction with the casing 18 of the duct, form a still greater number of passageways or compartments.

I have also illustrated in Fig. 14 a metal stairway having brackets 19 which are notched as at 20 and which are of channel shape cross section for permitting the vertical portion 21 of the step to slide downwardly through the channels and to be secured thereby. The recesses 20, as will be observed, are located at the corners permitting this sliding movement without the necessity of any fastening devices and also permitting the horizontal steps 22 to be inserted horizontally. This permits an economical and rapid construction of the stairways as will be apparent.

In the development of this prefabricated unit, no restriction in exterior design is imposed upon the home buyer nor has any limitation been made upon the designer's ingenuity. There is preferably reserved an area of seventy feet of floor area per floor, five hundred cubic feet of unit content and the designer may draw upon his own resourcefulness. The versatility of the houses constructed with the prefabricated units, as aforesaid, will thus be apparent. Interior planning is flexible and restricted only to the application of a unit shaft to each floor plan.

It will be understood by those skilled in the art that many changes in the construction and arrangement of the parts herein shown may be made in giving the device physical expression, without departing from the spirit of my invention as comprehended by the following claims.

What I claim is:

1. In a housing construction, in combination, a prefabricated unitary construction comprising a plurality of units, each constituting a separate service room, means for superimposing said units upon each other to form a rigid shaft, said means comprising collars associated with the upper and lower ends of each of said units, means to separate said collars, and means rigidly tying said collars together whereby to integrate them to form a rigid shaft, each of said units containing mechanical equipment for a given room of the house associated therewith.

2. A rigid shaft for housing constructions, said shaft comprising a plurality of superimposed independent units, each constituting a separate service room, mechanical equipment disposed within each of said units for a given room of a house, means for integrating said units with each other, said means comprising elements associated with the upper and lower ends of the units, tying devices for securing said elements from relative movement with respect to each other, said units being spaced whereby to permit the insertion therebetween of ducts and the like.

3. A housing construction comprising a load supporting member consisting of a plurality of building units rigidly secured together, each of said units including means at its upper end for supporting the joists of a floor extending transversely relatively from said building units.

4. A housing construction comprising a central rigid vertical shaft, said shaft consisting of a plurality of building units, each of said building units being vertically spaced from an adjacent building unit, means securing said building units in said spaced relation, and means cooperating with said spacing means for supporting a floor structure in surrounding relationship with said central shaft.

5. A housing construction comprising a rigid vertical shaft, said shaft consisting of a plurality of building units, each of said building units being vertically spaced from an adjacent building unit, means securing said building units in said spaced relation, and means cooperating with said spacing means for supporting a floor structure in at least partially surrounding relationship with said shaft.

JOHN J. WHELAN.